United States Patent [19]
Aramaki et al.

[11] Patent Number: 5,133,632
[45] Date of Patent: Jul. 28, 1992

[54] AUTOMATIC WAREHOUSE FOR CARTRIDGE TAPES

[75] Inventors: Mikio Aramaki; Seiki Tanaka; Shinichiro Hirano; Hidemasa Satoh; Jiro Agawa, all of Nagasaki, Japan

[73] Assignee: Mitsubishi Jukogyo Kabushiki Kaisha, Tokyo, Japan

[21] Appl. No.: 610,049

[22] Filed: Nov. 6, 1990

[30] Foreign Application Priority Data

Nov. 8, 1989 [JP] Japan .................. 1-288643

[51] Int. Cl.⁵ .................................. G11B 15/68
[52] U.S. Cl. ........................... 414/283; 360/92; 414/416; 901/1
[58] Field of Search ............ 414/266-269, 414/277-286, 330, 331, 332, 627, 737, 416; 901/1; 360/92

[56] References Cited

U.S. PATENT DOCUMENTS

| | | | |
|---|---|---|---|
| 3,351,219 | 11/1967 | Ruderfer | 414/277 |
| 3,504,808 | 4/1970 | Carabateas | 414/267 |
| 3,520,424 | 7/1970 | Lemelson | 414/283 |
| 3,750,804 | 8/1973 | Lemelson | 414/278 |
| 3,782,565 | 1/1974 | Doran et al. | 414/281 |
| 3,834,555 | 9/1974 | Bennington et al. | 414/627 |
| 3,854,604 | 12/1974 | Peterson et al. | 414/277 |
| 4,364,706 | 12/1982 | Kranzlmuller | 414/283 |
| 4,848,592 | 7/1989 | Shemeta | 414/737 |
| 4,886,412 | 12/1989 | Wooding et al. | 414/416 |
| 4,907,889 | 3/1990 | Simone | 360/92 |

FOREIGN PATENT DOCUMENTS

| | | | |
|---|---|---|---|
| 1504813 | 10/1967 | France | 414/267 |
| 1562162 | 2/1969 | France | 414/266 |
| 262304 | 10/1988 | Japan | 414/277 |

Primary Examiner—Sherman Basinger
Assistant Examiner—Thomas J. Brahan
Attorney, Agent, or Firm—Wenderoth, Lind & Ponack

[57] ABSTRACT

In an automated warehouse for storing cartridge tapes, a plurality of the cartridge tapes are accommodated in horizontal cases as arrayed in rows and columns. A plurality of shelves each adapted to support a plurality of the horizontal cases thereon as aligned horizontally, are in turn supported from a rack in a cantilever fashion at a plurality of respective levels. A robot having an arm is movable along the front of the rack. The arm is rotatable in a plane parallel to the surfaces of the shelves. Preferably, the arm of the robot is extensible and retractable and also is vertically movable, so that a cartridge picker mounted at the tip end of the arm can easily access each of the cartridge tapes accommodated in the automated warehouse.

4 Claims, 5 Drawing Sheets

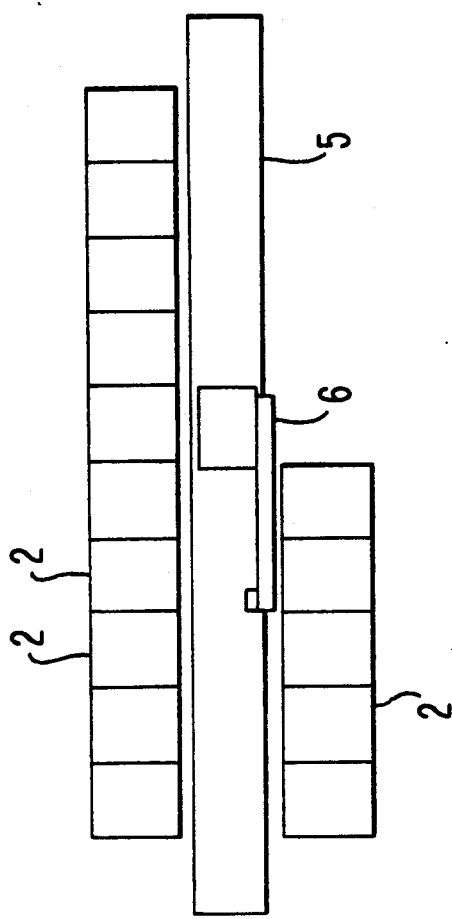
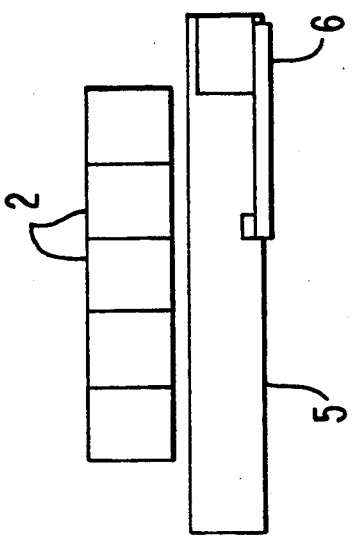
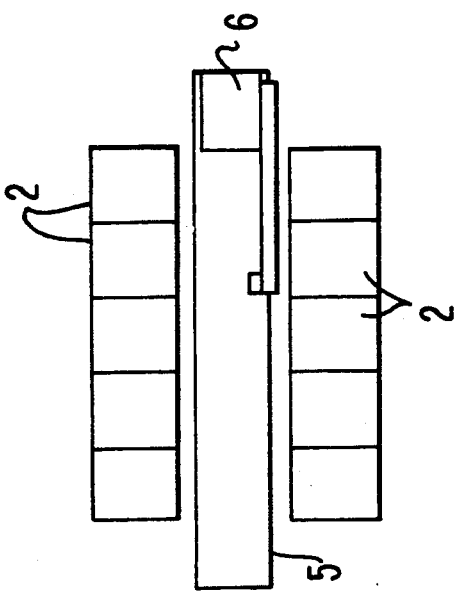

AUTOMATIC WAREHOUSE FOR CARTRIDGE TAPES

BACKGROUND OF THE INVENTION

1. Field of the Invention

The present invention relates to an automated warehouse for storing cartridge tapes of a magnetic or optical type which are used in a large computer of the like.

2. Description of the Prior Art

Heretofore, in automated warehouses for storing cartridge tapes and having a robot which travels along rails and selectively takes a cartridge tape from a rack disposed beside the rails, the racks extend linearly or along an arcuate path.

However, since the linearly extending racks are rather long, they are difficult to install within a building because of pillars, and it is also difficult to expand the effective length of the rack due to certain restrictions. In addition, the rack extending in an arcuate path can be expanded only unit by unit. Moreover, since these racks in the prior art only define one row and the cartridge tapes are placed upright one-by-one on the rack just as books are placed upright on a book shelf, there are shortcomings in that the charging/discharging operations are laborious and the cartridge tapes are liable to fall from the rack due to earthquakes or the like.

SUMMARY OF THE INVENTION

The present invention has been proposed in view of the above-described present status of the art, and it is one object of the present invention to provide an automated warehouse for storing cartridge tapes having a relatively large capacity and which facilitates the charging/discharging of cartridge tapes.

In order to achieve the aforementioned object, according to the present invention, there is provided an improved automated warehouse for storing cartridge tapes, comprising a horizontal case for accommodating cartridge tapes in a plurality of rows and in a plurality of columns, a rack supporting shelves in a cantilever fashion at a plurality of levels, each of the shelves being adapted to support a plurality of the horizontal cases thereon as aligned horizontally, and a robot movable along a front surface of the rack and having an arm that is rotatable in a plane parallel to the surfaces of the shelves.

According to the present invention, owing to the fact that the cartridge tapes are kept on the shelves of the rack by the intermediary of the horizontal case in which the cartridge tape are accommodated in a plurality of rows of columns, the capacity of the warehouse can be larger than that of a prior art warehouse of the same size. Moreover, since the shelves are supported from the rack in a cantilever fashion, rotation of the arm provided on the robot is facilitated, and thereby the charging/discharging of the cartridge tapes by means of the robot is made easy.

The above-mentioned and other objects, features and advantages of the present invention will become more apparent by referring to the following description of one preferred embodiment of the invention taken in conjunction with the accompanying drawings.

BRIEF DESCRIPTION OF THE DRAWINGS

In the accompanying drawings:

FIGS. 5(a)–5(c) are schematic views of examples of arrangements of racks.

DETAILED DESCRIPTION OF THE PREFERRED EMBODIMENT

Figure 1:
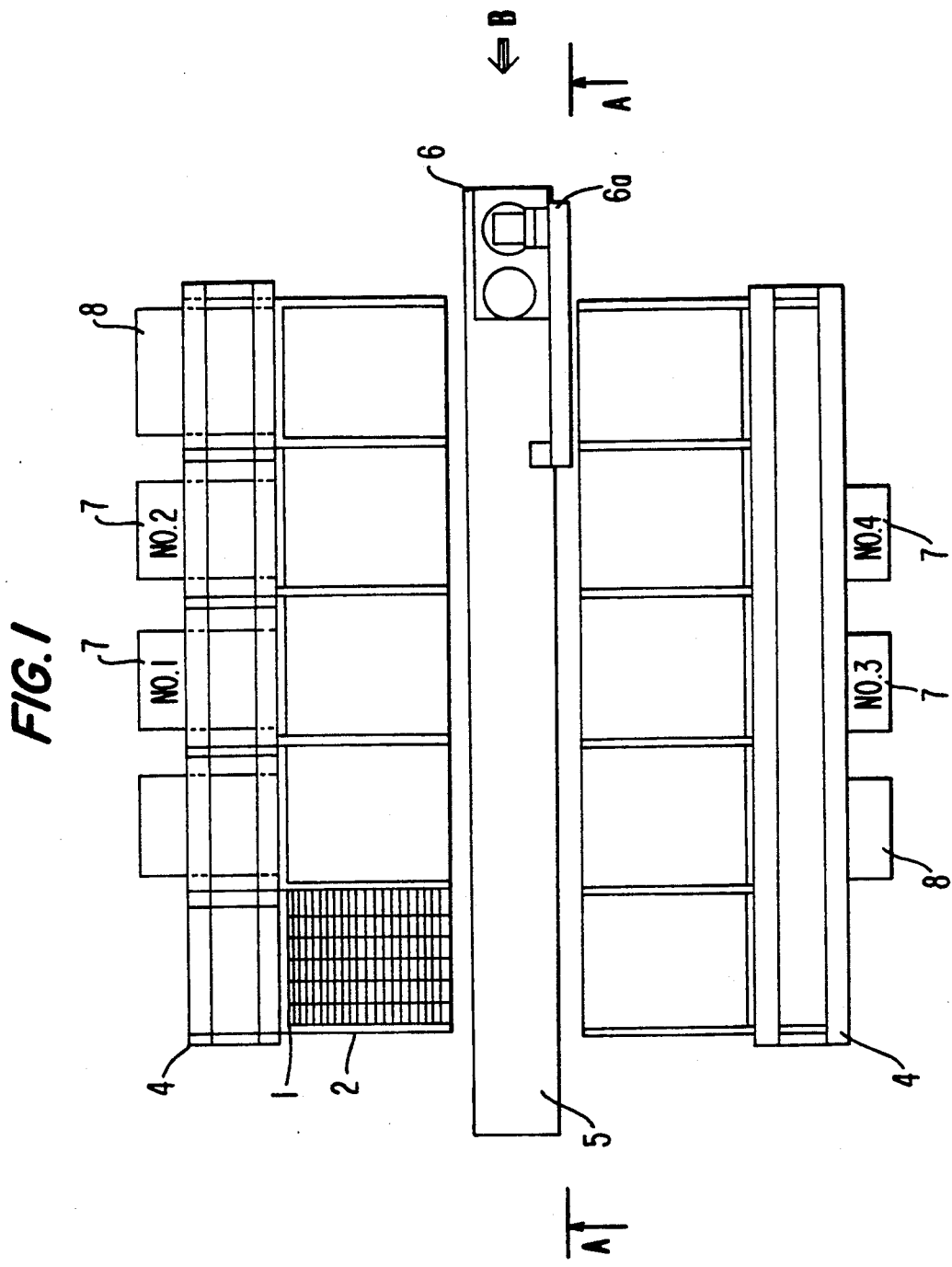
FIG. 1 is a plan view of one preferred embodiment of an automated warehouse according to the present invention.

Now the present invention will be described in greater detail in connection with one preferred embodiment illustrated in FIGS. 1 to 5. In these figures, reference numeral 1 designates a cartridge tape. A plurality of these tapes 1 are accommodated in horizontal cases 2 as arrayed in a plurality of rows and columns. A plurality of such horizontal cases 2 are disposed on a shelf 3 as aligned horizontally. A plurality of such shelves 3 are supported in a cantilever fashion from a rack 4 at a plurality of levels. A plurality of such racks 4 are provided as opposed to each other with a passageway left therebetween. A robot 6 is provided so as to be movable along rails 5 laid on the passageway, and a swing arm 6a associated with the robot 6 is provided so as to be rotatable in a plane parallel to the surfaces of the shelves 3. The swing arm 6a is mounted in a vertically movable manner by the intermediary of a ball screw 10 assembled in a post of the robot 6 as shown schematically in FIG. 2. And, the swing arm 6a is also extensible and retractable by the intermediary of a ball screw 20 assembled within the arm 6a as also shown schematically in FIG. 2.

In the illustrated embodiment, five horizontal cases 2 are placed on a shelf 3 as aligned horizontally, four shelves 3 are supported from each rack 4 at four respective levels, and further, on the rear surface of each rack 4 are provided two reading units 7 and one robot control unit 8.

Figure 4:
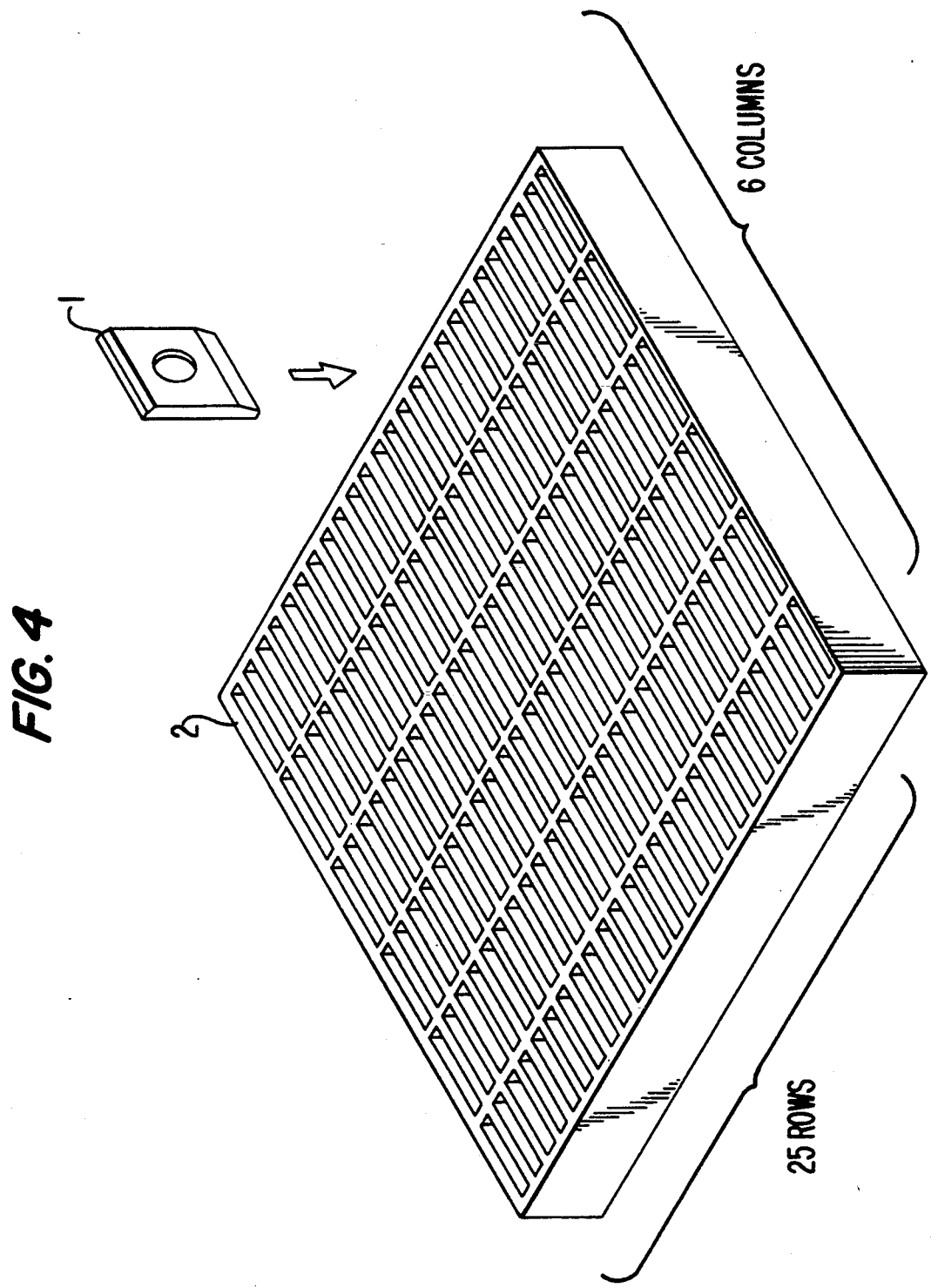
FIG. 4 is a perspective view of a horizontal case and one cartridge tape.

FIG. 4 shows one example of the array of the cartridge tapes 1 accommodated within a horizontal case 2. The tapes 1 are accommodated in an array of 6 columns ×25 rows, and accordingly, in the above exemplified rack 4 provided with the shelves 3 having the horizontal cases 2 thereon as aligned horizontally in five rows at four levels, the number of the accommodated cartridge tapes amounts to $150 \times 5 \times 4 = 3000$ in the case of a single rack arrangement as shown in FIG. 5a, but it amounts to 6000 in the case where racks 4 are disposed opposite one another as shown in FIG. 5b, and in the event that an additional rack 4 is disposed on one side of the rails 5 as shown in FIG. 5c, it amounts to 9000.

Figure 2:
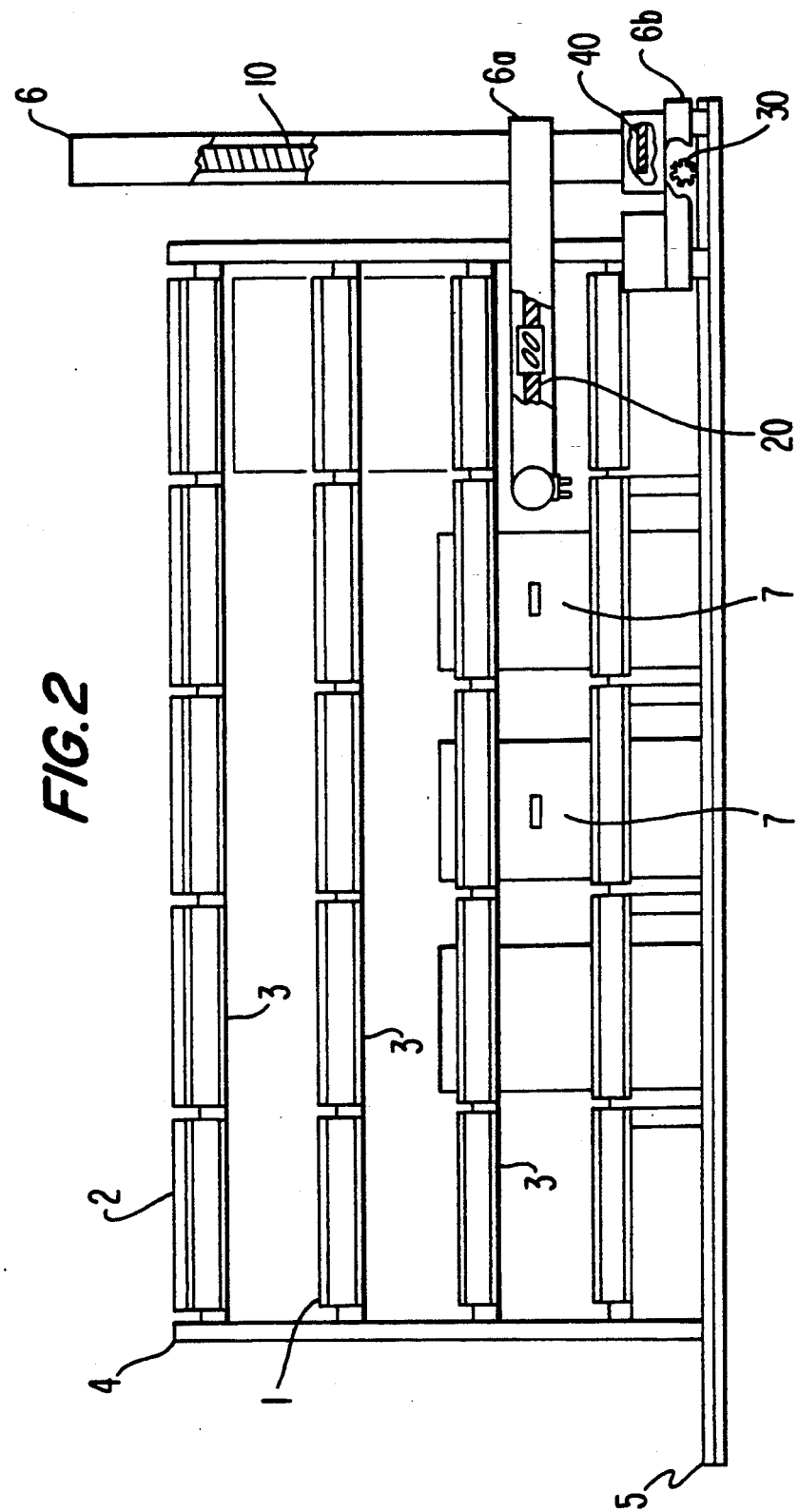
FIG. 2 is a front view of a portion of the warehouse as seen in the direction of arrows A—A in FIG. 1, with parts of the robot broken away.
Figure 3:
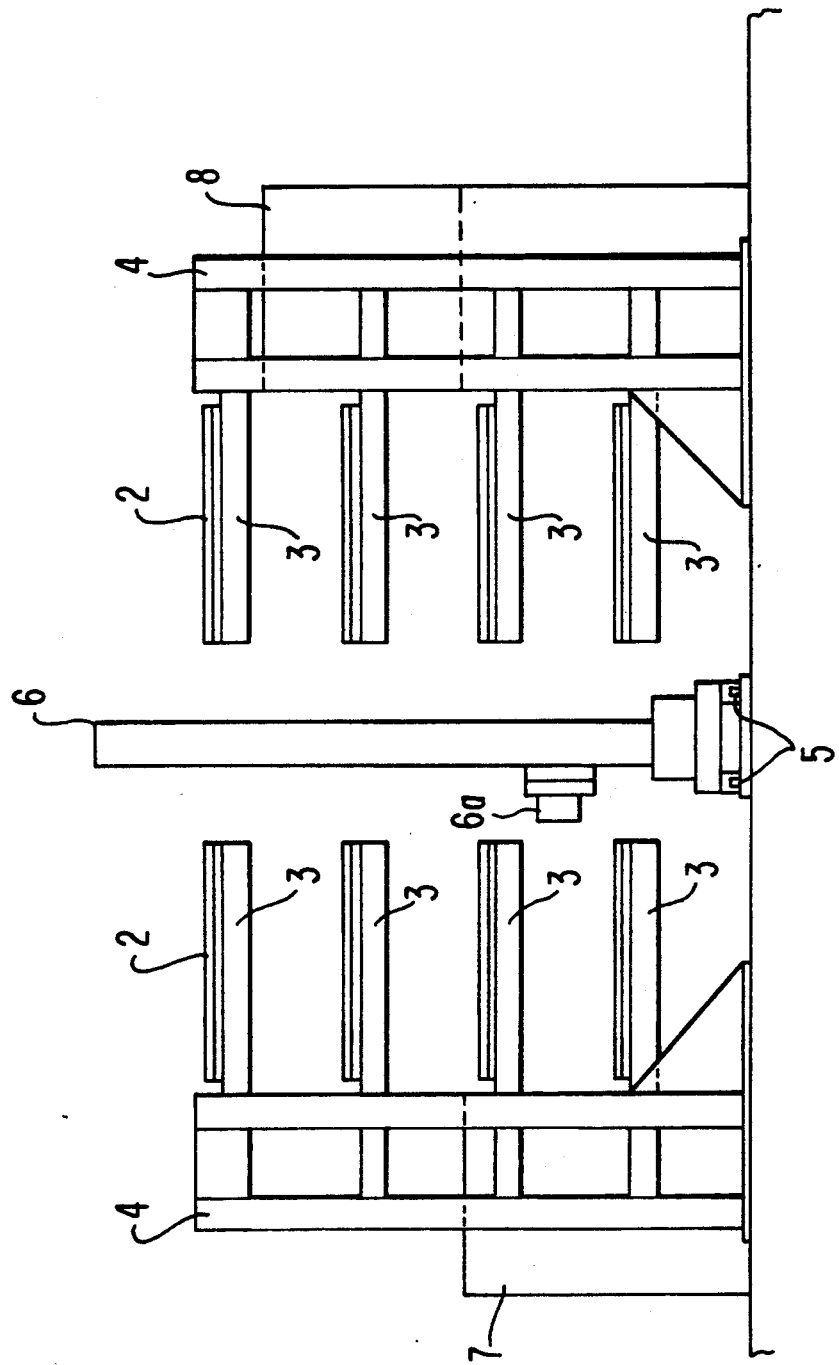
FIG. 3 is a side view of the warehouse as viewed in the direction of the bold arrow B in FIG. 1.

During operation, when a cartridge tape 1 kept in one horizontal case 2 supported on the shelf 3 at the fourth level from the top is to be taken out as seen in FIGS. 1 to 3, the arm 6a of the robot 6 is raised up to a level between the shelf 3 at the third level and the shelf 3 at the fourth level by rotation of the ball screw 10 assembled in the post of the robot 6. Then, the robot 6 is moved to the left as seen in FIG. 1 along a rack mounted to the rails 5 by rotation of a pinion gear 30 within a truck 6b of the robot 6. Subsequently, the arm 6a is extended or retracted to a desired position by rotation of the ball screw 20 assembled within the arm 6a. Also, the post of the robot is simultaneously rotated by 90° on the truck 6b by means of a rotating gear 40 to bring the arm 6a to a position at right angles to the rails 5, and the tape 1 at the predetermined position is taken out as pinched by fingers (a picker) provided at the tip end of the arm 6a. A series of these operations can be done in about 10 seconds.

In the above-described operations, in order to enable the robot 6 to perform movement in the lateral direction, rotation of the arm, and extension/retraction of the arm after the arm 6a has been raised to a desired level, the racks 4 do not have vertical posts intermediate the shelves 3, i.e. the shelves 3 are supported only in a cantilever fashion as shown in FIG. 3.

As will be obvious from the detailed description of the preferred embodiment above, according to the present invention, owing to the fact that the subject automatic warehouse for storing cartridge tapes comprises a horizontal case for accommodating cartridge tapes in a plurality of rows and columns, a rack for supporting shelves in a cantilever fashion at a plurality of levels, each of the shelves being adapted to support a plurality of the horizontal cases thereon as aligned horizontally, and a robot movable along the front of the rack and having an arm that is rotatable in a plane parallel to the surfaces of the shelves, the cartridge tapes can be arrayed not only in the lengthwise direction of the shelf but also in the depthwise direction thereof, the rack does not have to be long to accommodate many tapes and a length-to-width ratio of each rack is comparatively small as viewed in plan. Hence, restrictions in the place of installation become less severe. In addition, because the tapes can be taken out case by case, the maintenance of the cartridge tapes such as the replacement thereof becomes easy. Furthermore, since the cartridge tapes are accommodated in the horizontal case, there is an advantage in that they will not fall from the racks during an earthquake or the like.

While a principle of the present invention has been described above in connection with one preferred embodiment of the invention, it is a matter of course that many apparently widely different embodiments of the present invention could be made without departing from the spirit of the present invention.

We claim:

1. An automated warehouse for storing cartridge tapes, said warehouse comprising:

horizontal cases each defining cartridge tape accommodating spaces therein in a horizontal planar array of rows and columns, each of said cases is adapted to accommodate a plurality of cartridge tapes arranged in said spaces in a plurality of rows and columns, and said tape accommodating spaces in each said horizontal case being open to the top of the case wherein cartridge tapes occupying the spaces in each said case are removable therefrom out of the top of said case;

a rack;

a plurality of shelves each supported only at one end thereof by said rack, said rack being the only means of support for said shelves in the warehouse such that said shelves project from said rack and are supported only in a cantilever fashion, each of said shelves defining an upper horizontal surface, said shelves being vertically spaced from one another so as to be disposed at respective levels in the warehouse and so as to defined spaces therebetween, and the upper horizontal surface of each of said shelves having a length as taken in a longitudinal direction of the rack which is greater than several lengths of the horizontal cases such that each of said shelves is adapted to support a plurality of said horizontal cases on the upper horizontal surface thereof as aligned horizontally in the longitudinal direction of the rack;

a robot including drive means for moving the robot along the front of said rack in said longitudinal direction of the rack, a robot arm, and means for rotating said robot arm in a horizontal plane parallel to said upper surfaces of said shelves; and said spaces between said shelves being free of vertically extending posts.

2. An automated warehouse for storing tapes as claimed in claim 1, wherein said robot includes means for extending and retracting said robot arm.

3. An automated warehouse for storing tapes as claimed in claim 1, wherein said robot includes means for moving said robot arm vertically.

4. An automated warehouse for storing tapes as claimed in claim 1, and further comprising guide means extending in said longitudinal direction at the front of said rack for guiding said robot n said longitudinal direction.

* * * * *